(12) United States Patent
Ozawa et al.

(10) Patent No.: US 9,329,467 B2
(45) Date of Patent: May 3, 2016

(54) PROJECTOR AND METHOD FOR CONTROLLING PROJECTOR

(71) Applicant: SEIKO EPSON CORPORATION, Tokyo (JP)

(72) Inventors: Takaaki Ozawa, Shiojiri (JP); Takefumi Sakakibara, Matsumoto (JP); Kazunori Maeta, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 14/103,133

(22) Filed: Dec. 11, 2013

(65) Prior Publication Data

US 2014/0176918 A1  Jun. 26, 2014

(30) Foreign Application Priority Data

Dec. 25, 2012  (JP) ................................. 2012-280685

(51) Int. Cl.
*G03B 21/20* (2006.01)
*G06F 1/32* (2006.01)
*H04N 9/31* (2006.01)
*H05B 41/288* (2006.01)

(52) U.S. Cl.
CPC ........ *G03B 21/2053* (2013.01); *G03B 21/2026* (2013.01); *G06F 1/3203* (2013.01); *H04N 9/3155* (2013.01); *H05B 41/288* (2013.01)

(58) Field of Classification Search
CPC ................................ G03B 21/42; G03B 21/24
USPC ...................................................... 353/85, 121
See application file for complete search history.

(56) References Cited

U.S. PATENT DOCUMENTS

| | | | |
|---|---|---|---|
| 6,979,960 B2 * | 12/2005 | Okawa et al. | 315/291 |
| 7,273,285 B2 * | 9/2007 | Yen et al. | 353/85 |
| 7,354,159 B2 | 4/2008 | Nakamura et al. | |
| 2010/0238418 A1 | 9/2010 | Soma et al. | |
| 2011/0043771 A1 * | 2/2011 | Hirao | 353/85 |
| 2011/0128508 A1 * | 6/2011 | Yamada et al. | 353/85 |
| 2012/0206698 A1 | 8/2012 | Hino | |

FOREIGN PATENT DOCUMENTS

| | | |
|---|---|---|
| JP | A-5-326183 | 12/1993 |
| JP | A-8-234848 | 9/1996 |
| JP | A-10-239767 | 9/1998 |
| JP | A-11-288790 | 10/1999 |

(Continued)

OTHER PUBLICATIONS

Extended Search Report Issued in European Patent Application No. 13197527.8 dated May 8, 2014.

*Primary Examiner* — William C Dowling
*Assistant Examiner* — Jerry Brooks
(74) *Attorney, Agent, or Firm* — Oliff PLC

(57) ABSTRACT

A projector including a discharge tube as a light source includes a light source driver that supplies the discharge tube with electric power and an electric power control portion that controls the level of the electric power with which the light source driver supplies the discharge tube to perform a normal mode in which the light source driver supplies electric power of a predetermined electric power level and a power saving mode in which the light source driver supplies electric power of a power saving level lower than the predetermined electric power level. The power saving mode is a mode in which light emission from the discharge tube can be maintained.

9 Claims, 5 Drawing Sheets

(56) References Cited

FOREIGN PATENT DOCUMENTS

| JP | A-2000-131668 | 5/2000 |
| JP | A-2003-29341 | 1/2003 |
| JP | A-2012-108216 | 6/2012 |

* cited by examiner

PROJECTOR AND METHOD FOR CONTROLLING PROJECTOR

CROSS-REFERENCE TO RELATED APPLICATION

The entire disclosure of Japanese Patent Application No. 2012-280685, filed Dec. 25, 2012 is expressly incorporated by reference herein.

BACKGROUND

1. Technical Field

The present invention relates to a projector and a method for controlling the projector.

2. Related Art

As a light source of a projector of related art, there is a known light source using a discharge tube, such as a high-pressure mercury lamp. There is a known projector of this type in which electric power supplied to the discharge tube is reduced for power saving (see JP-A-2012-108216, for example). For example, the projector described in JP-A-2012-108216 attempts to reduce the amount of power consumption during projection without degradation in image quality by reducing electric power supplied to the discharge tube based, for example, on illuminance in the surrounding environment.

To essentially achieve power saving, electric power supply to the discharge tube only needs to be terminated (zero electric power). Once the electric power supply to the discharge tube is terminated, however, it undesirably takes a very long time to restore optical intensity of the discharge tube after the projector is restarted.

SUMMARY

An advantage of some aspects of the invention is to effectively achieve power saving in a projector including a discharge tube.

An aspect of the invention is directed to a projector that includes a discharge tube and projects an image by using a light source including the discharge tube. The projector includes a discharge tube drive section that supplies the discharge tube with electric power and an electric power control section that controls the level of the electric power with which the discharge tube drive section supplies the discharge tube to perform a normal mode in which the discharge tube drive section supplies electric power of a rated electric power level and a power saving mode in which the discharge tube drive section supplies electric power of a power saving level lower than the rated electric power level when the image is not required to be projected, and the power saving mode is a mode in which slight light emission can be maintained.

The electric power control section may change the level of the electric power supplied to the discharge tube in a restricted manner when the power saving mode is changed back to the normal mode or when the normal mode is changed to the power saving mode.

According to the aspect of the invention, power saving is achieved by reducing the electric power supplied to the discharge tube to the power saving level when no image is required to be projected on a screen or any other projection surface. Further, maintaining the power saving level instead of completely reducing the electric power supplied to the discharge tube to zero allows the image projection to be immediately resumed when the projection is resumed. Further, the following problems can be solved: In the power saving mode, since a pair of electrodes in the discharge tube shrink, abruptly supplying electric power of the rated level in order to restore the state in the normal mode prevents the pair of electrodes from expanding straight with respect to each other, resulting in degradation in light emission characteristics or breakage of the electrodes due to produced stress; and in the normal mode, since the pair of electrodes in the discharge tube expand, sharply reducing the supplied electric power to the level in the power saving mode prevents the pair of electrodes from shrinking straight with respect to each other, which cannot maintain light emission from the lamp.

That is, when the electric power supplied to the discharge tube is changed from the power saving level to the rated electric power level or changed from the rated electric power level to the power saving level, changing the electric power level in a non-sharp manner allows the electrodes in the discharge tube to expand or shrink straight, preventing a damage from being made to the discharge tube.

Further, the electric power level may be changed in a restricted manner when an intermediate electric power level higher than the power saving level is changed to the rate electric power level.

In this case, since the electric power level is changed in a non-restricted manner when the supplied electric power level is changed from the power saving level to the intermediate electric power level, the electric power level can be controlled in the following two ways: The electric power level is so changed in a restricted manner that the life of the discharge tube is not affected; and the electric power level is quickly changed to the extent that the life of the discharge tube is not affected. As a result, not only can effective power saving be achieved but also no damage is made to the discharge tube and the period required to change the power saving mode to the normal mode can be shortened.

Further, in the process of changing the intermediate electric power level to the rated electric power level, the level of the electric power supplied from the discharge tube drive section may be raised at a speed slower than a speed in a process of changing the power saving level to the intermediate electric power level.

Further, a low luminance level may be set between the rated electric power level and the power saving level, and the electric power level may be changed in a restricted manner when the supplied electric power is changed from the low luminance level to the power saving level. That is, the electric power level may be changed in a non-restricted manner when the supplied electric power is changed from the rated electric power level to the low luminance level. In this case, the electric power level can be controlled in the following two ways: The electric power level is so changed in a restricted manner that the life of the discharge tube is not affected; and the electric power level is quickly changed to the extent that the life of the discharge tube is not affected. As a result, not only can effective power saving be achieved but also no damage is made to the discharge tube in the process of lowering the electric power level and the period required to change the normal mode to the power saving mode can be shortened.

The configuration described above may further include a projection section including the discharge tube, a modulation section that modulates light emitted from the discharge tube, and a projection system that projects the light modulated by the modulation section and a projection control section that performs non-projection control in which projection performed by the projection section is terminated by carrying out a process of turning off the discharge tube and the electric power control section may cause the projector to enter the power saving mode when the projection control section performs the non-projection control.

In this case, even when the power saving level is set at a level greatly lower than the level of the rated electric power of the discharge tube, no damage will be made to the discharge tube because the discharge tube is turned off after the power saving mode is performed, whereby more effective power saving is achieved.

In the configuration described above, examples of the process of turning off the discharge tube may include a mute action in which the image display action is terminated, a sleep action in which the projector waits until the projector is operated, a cover close action in which a cover blocks the projection system, an elapse of a predetermined period during which no signal is inputted to the projector (not signal), and an elapse of a predetermined period during which a signal inputted to the projector is searched.

In this case, the electric power supplied to the discharge tube can be lowered to the level in the power saving mode before the discharge tube is turned off for effective power saving.

Further, when the power saving mode (such as mute action, sleep action, cover close action, no signal input, and input signal search) is changed back to a normal action state (normal mode), the electric power level is changed in a restricted manner.

Further, the power saving mode may not start until a predetermined period elapses after the sleep action starts.

In this case, even when operation of changing the power saving mode back to the normal operation state is performed after the sleep action starts but before the predetermined period elapses, the discharge tube immediately emits light because the power saving mode is not performed.

Further, a setting section that sets whether or not the power saving mode is started may be provided, and the electric power control section may cause the projector to enter the power saving mode when the projection control section performs any of the mute action, the sleep action, the cover close action, and the other actions and the setting section sets the power saving mode to be performed in response to the action.

In this case, optimum action can be performed in consideration of the latency required when the power saving mode is changed to the normal mode and the tendency of a user who uses the projector. Power saving in the projector is therefore more effectively achieved without compromising the convenience of the user.

BRIEF DESCRIPTION OF THE DRAWINGS

The invention will be described with reference to the accompanying drawings, wherein like numbers reference like elements.

FIG. 2A shows an example in which a normal mode is changed to a power saving mode when a mute action or a cover close action is performed, FIG. 2B is an example in which supplied electric power is changed from that in the normal mode to that in the power saving mode when a sleep mode is performed, and FIG. 2C shows an example in which the power saving mode is changed to the normal mode.

DESCRIPTION OF EXEMPLARY EMBODIMENTS

An embodiment of the invention will be described below with reference to the drawings.

Figure 1:
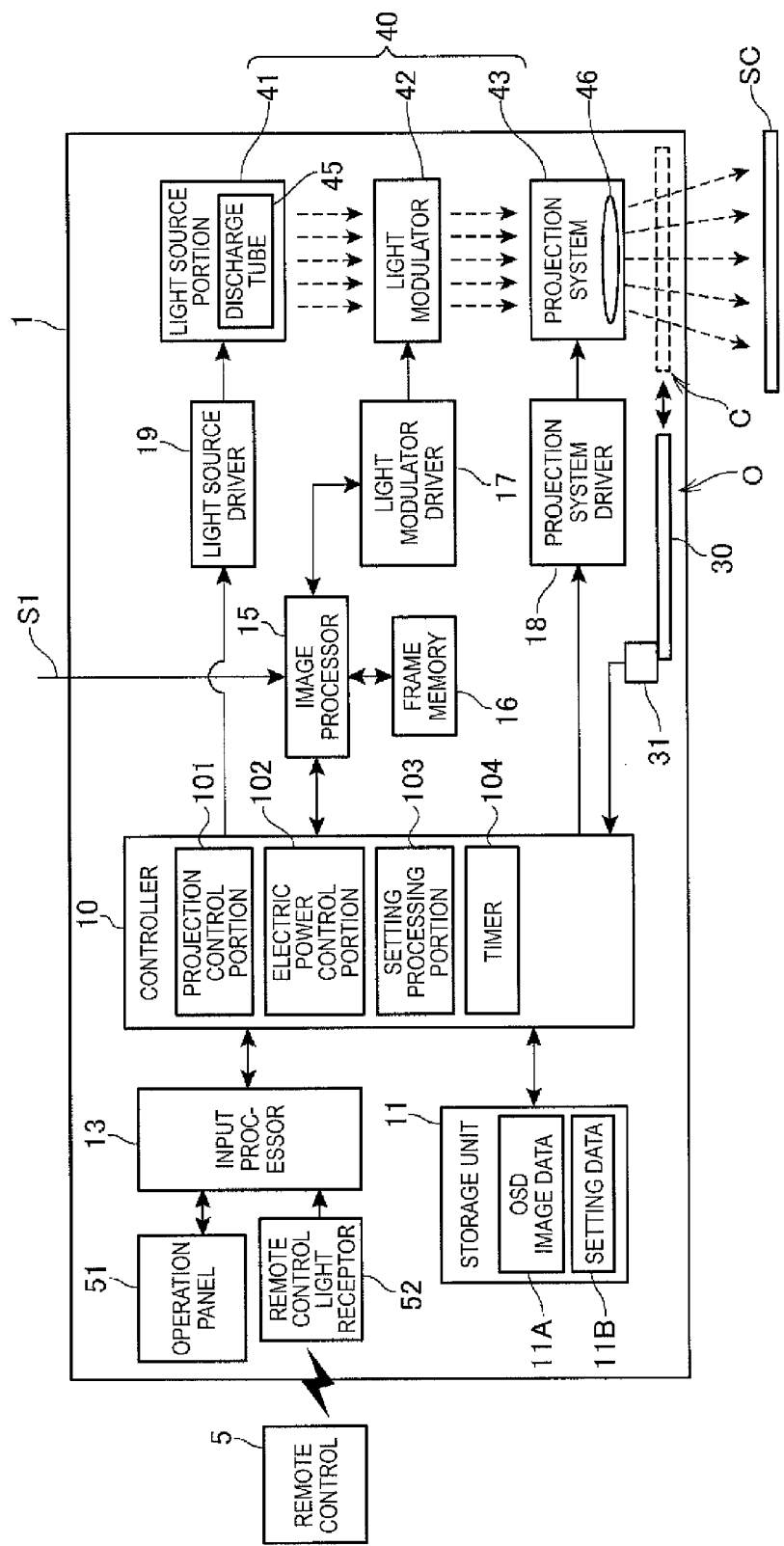
FIG. 1 is a block diagram showing the configuration of a projector according to an embodiment.

FIG. 1 is a block diagram showing an overall configuration of a projector 1 according to the embodiment. The projector 1 is an apparatus that is connected to an external image supply apparatus (not shown), such as a personal computer and a variety of video image players, and projects input image data S1 inputted from the image supply apparatus onto a projection surface, such as a screen SC. The image supply apparatus described above may include a video reproduction apparatus, a DVD reproduction apparatus, a television tuner, a CATV set-top box, a video game console and other video image output apparatus, and a personal computer. The present embodiment will be described with reference to a case where the image supply apparatus inputs digital image data formed of motion images as the input image data S1 to an image processor 15. The digital image data contains not only image data itself but also information on the format of the digital image data (including format of stereoscopic video images, frame rate, and other factors).

The projector 1 can display both still images and motion images (video images). The following description will be made with reference to a case where motion images inputted from the image supply apparatus are outputted and displayed, and the process of displaying the input image data S1 in the following description is directly applicable to a case where still images are displayed.

The projector 1 is broadly formed of a projection unit 40 (projection section), which forms an image to be projected on a projection object, and an image processing system that electrically processes the image displayed by the projection unit 40. The projection unit 40 is formed of a light source portion 41, a light modulator 42 (modulation section), and a projection system 43. The light source portion 41 includes a discharge tube 45, such as a xenon lamp or an ultrahigh-pressure mercury lamp, as a light source. The light source portion 41 may further include a reflector and an auxiliary reflector that guide light emitted from the discharge tube 45 to the light modulator 42. The light source portion 41 may still further include a group of lenses (not shown) for improving optical characteristics of projected light, a polarizer, and a light attenuator that is located in a position on a path to the light modulator 42 and reduces the amount of light emitted from the light source.

The light modulator 42 corresponds to a modulation section that modulates light outputted from the light source portion 41 based on image data. The light modulator 42 is configured based, for example, on a method using three transmissive or reflective liquid crystal light valves or three digital mirror devices corresponding to RGB colors. The light modulator 42 may alternatively employ a DMD method using a combination of a color wheel that transmits RGB light fluxes among light fluxes contained in white light emitted from the light source and a single digital mirror device (DMD).

In the present embodiment, the light modulator 42 has a configuration based on liquid crystal light valves. The light modulator 42 includes transmissive liquid crystal panels each of which has a plurality of pixels arranged in a matrix, and the plurality of pixels form an image, which modulates the light emitted from the discharge tube 45. The light modulator 42 is driven by a light modulator driver 17, which will be described later, and forms an image by changing light transmittance of each of the pixels arranged in a matrix.

The projection system 43 includes a group of lenses that enlarge and reduce an image to be projected and adjust focusing, a zoom adjustment motor for zoom factor adjustment, a focus adjustment motor for focus adjustment, and a lens shift motor for lens shifting. The projection system 43 projects the light modulated by the light modulator 42 (image light) toward the screen SC, and the group of lenses form an image on the screen SC. Among the group of lenses provided in the projection system 43, a lens exposed through a main body of the projector 1 is called a projection lens 46.

The following drivers are connected to the projection unit 40: a projection system driver 18, which drives the motors provided in the projection system 43 under the control of a controller 10; and a light source driver 19 (discharge tube drive section), which drives the light source provided in the light source portion 41 under the control of the controller 10.

When the zoom factor is changed manually between a telescopic end and a wide angle end instead of using the motorized zoom mechanism, the zoom adjustment motor is unnecessary. Further, when the focusing is manually adjusted instead of using the motorized focus adjustment mechanism, the focus adjustment motor is unnecessary. When the lens shifting is performed manually, the lens shift motor is unnecessary. In these cases, the projection system driver 18 is also unnecessary.

Further, although not shown, an automatic or manual trapezoidal distortion correction mechanism may be provided.

A lens cover 30 is disposed in a position in front of the projection lens 46, that is, outside the projection lens 46. The lens cover 30 functions as a shutter that blocks projected light from the projection unit 40. The lens cover 30 is movable with the aid of a manual slide mechanism (not shown) between a closed position C (closed) indicated by the broken line in FIG. 1 and an open position O (open) indicated by the solid line in FIG. 1. The lens cover 30 may alternatively be movable with the aid of a motorized mechanism. The lens cover 30, when located in the closed position C, covers the front side of the projection lens 46 to block light having exited out of the projection lens 46. In this configuration, no light reaches the screen SC even when the discharge tube 45 emits light as long as the lens cover 30 is located in the closed position C. On the other hand, the lens cover 30 located in the open position O does not block the light having exited out of the projection lens 46. The projector 1 includes a cover detector 31. The cover detector 31 is, for example, a switch-based or optical sensor and outputs a detection value representing whether or not the lens cover 30 is located in the open position O to the controller 10. The controller 10 can determine whether the lens cover 30 is located in the open position O or the closed position C based on the detection value from the cover detector 31.

In this example, the controller 10 acquires the detection value from the cover detector 31 and determines whether or not the lens cover 30 is located in the open position O to identify whether the position of the lens cover 30 is the open position O or the closed position C. In this case, the controller 10 determines that the lens cover 30 is closed when the lens cover 30 is located in a position other than the open position O.

The cover detector 31 may alternatively be so configured that it can output a detection value representing whether or not the lens cover 30 is located in the closed position C. In this case, the controller 10 acquires the detection value from the cover detector 31 and determines whether or not the lens cover 30 is located in the closed position C to identify the position of the lens cover 30. That is, the controller 10 determines that the lens cover 30 is closed when the lens cover 30 is located in the closed position C, whereas determining that the lens cover 30 is located in the open position O when the lens cover 30 is not located in the closed position C (when the lens cover 30 is located in a position other than the closed position C).

Further, the cover detector 31 may output a detection value representing whether the lens cover 30 is located in the open position O or the closed position C. In this case, the controller 10 determines whether the lens cover 30 is located in the open position O or the closed position C based on the detection value from the cover detector 31.

The image processing system is configured based on the controller 10, which works as a key component and oversees and controls the entire projector 1. The image processing system includes a storage unit 11, an input processor 13, an image processor 15, and a light modulator driver 17.

The storage unit 11 stores data processed by the controller 10, a program executed by the controller 10, and other information.

The input processor 13 detects operation performed via an operation panel 51 and a remote control light receptor 52 and outputs an operation signal corresponding to the detected operation to the controller 10.

The image processor 15 processes the input image data S1 under the control of the controller 10. The image processor 15 draws an image in a frame memory 16 on a frame basis based on the input image data S1, produces an image signal based on which the drawn image is displayed, and outputs the image signal to the light modulator driver 17. The light modulator driver 17 drives the light modulator 42 to draw the image based on the image signal outputted from the image processor 15.

The controller 10 reads and executes a control program stored in the storage unit 11 to control the components of the projector 1. The controller 10 detects details of operation performed by a user based on the operation signal inputted from the input processor 13. The controller 10 controls the image processor 15, the light modulator driver 17, the projection system driver 18, and the light source driver 19 in correspondence with the detected operation to project video images on the screen SC.

The operation panel 51, which includes a variety of switches operated by the user and a variety of indicators, is disposed on the main body of the projector 1. The operation panel 51 is connected to the input processor 13. When a switch on the operation panel 51 is operated, an operation signal corresponding to the operated switch is outputted from the input processor 13 to the controller 10. Further, the input processor 13 causes an indicator on the operation panel 51 to light up or blink as appropriate in accordance with the action or setting state of the projector 1 under the control of the controller 10.

The projector 1 is provided with a remote control 5 operated by the user. The remote control 5 has a variety of buttons and outputs an infrared signal in correspondence with operation of any of the buttons. The remote control light receptor 52, which receives the infrared signal outputted from the remote control 5, is disposed on the main body of the projector 1. The remote control light receptor 52 decodes the infrared signal received from the remote control 5, produces an operation signal representing details of the operation performed via the remote control 5, and outputs the operation signal to the controller 10.

The storage unit 11 formed, for example, of a flash memory, stores the control program and data described above and OSD image data 11A. The OSD image data 11A is another type of image data different from the input image data S1 and superimposed on an image based on the input image data S1, and the combined image is displayed on the screen SC. The OSD image data 11A is, for example, an image of a menu screen displayed when the user makes the setting of a function of the projector 1. In the present embodiment, image data on a setting screen 60 (FIG. 3), which will be described later, is stored as the OSD image data 11A. The storage unit 11 can store a plurality of types of OSD image data 11A.

The controller 10 reads OSD image data 11A stored in the storage unit 11 and corresponding to the details of a process to be carried out. The controller 10 instructs the image processor 15 to carry out a process of superimposing the read OSD image data 11A on the input image data S1 and display the combined data. In this process, the image processor 15 draws a combined image produced by superimposing the OSD image data 11A on image data in each frame of the input image data S1 by using the frame memory 16. The image processor 15 outputs a display signal carrying the combined image drawn in the frame memory 16 to the light modulator driver 17. The light modulator driver 17 draws the combined image on the liquid crystal panel of the light modulator 42. The combined image is thus projected on the screen SC. The controller 10 can alternatively display only the OSD image data 11A on the screen SC without displaying the input image data S1. In this case, the background of the OSD image data 11A has a preset background color.

The storage unit 11 further stores setting data 11B. The setting data 11B are data set by the user who operates the operation panel 51 or the remote control 5. For example, the user sets details of a setting item in the setting screen displayed by the controller 10 based on the OSD image data 11A, and the thus set details are stored as the setting data 11B.

The controller 10 refers to the setting data 11B when controlling the components of the projector 1 and operates in accordance with the details set in the setting data 11B.

The controller 10, which executes the program stored in the storage unit 11, functions as a projection control portion 101, an electric power control portion 102 (electric power control section), a setting processing portion 103 (setting section), and a timer 104.

The projection control portion 101 controls the image processor 15, the light modulator driver 17, the projection system driver 18, and the light source driver 19 to project an image based on the input image data S1 on the screen SC. In the following description, a normal projection state refers to a state in which the discharge tube 45 emits light, the light modulator 42 forms an image, and projected light reaches the screen SC. In the normal projection state, the light source driver 19 may supply the discharge tube 45 with rated electric power of the discharge tube 45.

Sleep Mode

In a period during which no input image data S1 is inputted and no detection signal is inputted from the input processor 13, the projection control portion 101 counts the duration of the state in which no detection signal is inputted (hereinafter referred to as non-operation period). The projection control portion 101 uses the timer 104 to count the non-operation period. When the non-operation period becomes equal to a preset sleep set period, the projection control portion 101 causes the projector 1 to enter a sleep mode. The action in the sleep mode corresponds to a sleep action. The projection control portion 101 controls the image processor 15 and the light modulator driver 17 to cause the light modulator 42 to draw a plain black image (projected image). Further, after a set period (first predetermined period) elapses, the projection control portion 101 may switch the electric power supplied from the light source driver 19 to the discharge tube 45 to electric power in a power saving mode, as will be described later. Moreover, after an OFF set period (second predetermined period) elapses, the electric power supplied to the discharge tub 45 is reduced to zero. The projection control portion 101 may disable the functions of the controller 10 except a function of detecting an operation signal from the input processor 13 and may further disable the functions of the image processor 15, the light modulator driver 17, the projection system driver 18, and the light source driver 19. In this case, the electric power consumed in a period during which the operation panel 51 or the remote control 5 is not operated can be reduced. The projected image in the sleep mode is not necessarily a plain black image but may be a plain blue image or a logo image. Once an operation signal from the input processor 13 or input image data S1 is inputted in the sleep mode, the projection control portion 101 returns to the normal mode.

Mute

When the user operates the operation panel 51 or the remote control 5 to issue an instruction of performing a mute action, the projection control portion 101 starts the mute action. In the mute action, projection of input image data S1 on the screen SC is temporarily terminated. During the mute action, the controller 10 controls the image processor 15 and the light modulator driver 17 to cause the light modulator 42 to draw a plain black, blue image or a logo image. The mute action is performed even when input image data S1 is being inputted. After a mute timer (third predetermined period) elapses, the projection control portion 101 may switch the electric power supplied from the light source driver 19 to the discharge tube 45 to the electric power in the power saving mode, as will be described later. Further, after an OFF set period (fourth predetermined period) elapses, the electric power supplied to the discharge tube 45 is reduced to zero. The projection control portion 101 may disable the functions of the controller 10 except the function of detecting an operation signal from the input processor 13. Further, the functions of the image processor 15, the light modulator driver 17, the projection system driver 18, and the light source driver 19 may also be disabled. In this case, the electric power consumed in a period during which the operation panel 51 or the remote control 5 is not operated can be reduced.

When the user operates the remote control 5 or the operation panel 51 during the mute action to instruct termination of the mute action, the projection control portion 101 returns to the normal mode.

Cover Close Mode

The projection control portion 101 determines the position of the lens cover 30 based on the detection value from the cover detector 31. Having determined that the lens cover 30 is located in the closed position C, the projection control portion 101 performs a cover close mode action to stop projecting image light on the screen SC. The projection control portion 101 controls the image processor 15 and the light modulator driver 17 to cause the light modulator 42 to draw a plain black image. The cover close mode action is performed even when input image data S1 is being inputted. When the cover is closed, the projection control portion 101 may switch the electric power supplied from the light source driver 19 to the discharge tube 45 to electric power one step lower than that in the normal projection state, as will be described later. Further, after an OFF set period (fifth predetermined period) elapses, the electric power supplied to the discharge tube 45 is reduced to zero.

Having determined that the lens cover 30 is located in the open position O during the cover close mode, the projection control portion 101 returns to the normal mode. The projection control portion 101 continues performing the cover close action until determining that the lens cover 30 is located in the open position O even when input image data S1 is inputted or the remote control 5 or the operation panel 51 is operated. Having determined that the lens cover 30 is located in the open position O based on the detection value from the cover detector 31, the projection control portion 101 returns to the normal projection state. The projection control portion 101 may therefore disable the functions of the controller 10 during the cover close action except the function of acquiring a detection value from the cover detector 31 to determine the position of the lens cover 30. Further, the functions of the image processor 15, the light modulator driver 17, the projection system driver 18, and the light source driver 19 may be disabled. In this case, the electric power consumed in a period during which the lens cover 30 is closed can be reduced.

A feature of the invention resides in the transition to the power saving mode in the sleep mode, the mute action, the cover close action performed by the projection control portion 101 and the return from the power saving mode. In addition to the above, the same transition and return actions may be performed when a no signal input state continues and when an input signal detection state continues.

The electric power control portion 102 controls the light source driver 19 to change the electric power supplied to the discharge tube 45. The light source driver 19 not only outputs rated electric power to the discharge tube 45 but also changes the supplied electric power within a range including the rated electric power and electric power lower than the rated electric power. The value of the electric power supplied from the light source driver 19 to the discharge tube 45 is referred to as an electric power level or simply a level. The light source driver 19 may change the level of a voltage outputted therefrom stepwise. In this case, the number of levels to which the output voltage is changed is not limited to a specific value.

The discharge tube 45 to which electric power of the rated level is supplied emits light of luminance that satisfies the specifications of the discharge tube 45, whereas the discharge tube 45 to which electric power slightly lower than the rated level is supplied can emit light of luminance lower than that specified in the specifications. Further, the discharge tube 45 to which electric power greatly lower than the rated level is supplied can emit light of luminance further lower than that specified in the specifications.

When the electric power supplied to the discharge tube 45 continues to be extremely lower than the rated electric power, the shape of discharge electrodes in the discharge tube is inappropriately deformed or other problems occur, resulting in, for example, a decrease in luminance, light emission stability, and life. On the other hand, when the supplied electric power extremely lower than the rated electric power continues only for a short period, the problems described above will not occur. Further, when the electric power supplied to the discharge tube 45 is changed from a level extremely lower than the rated level to the rated level at high speed, the problems may occur in some cases. This is a phenomenon common to typical lamps that emit light based on discharge. To avoid the phenomenon, a projector of related art including a discharge tube as the light source has only one level of electric power supplied to the discharge tube 45, the rated level, or only two levels, the rated level and a level slightly lower than the rated level.

The present inventors have paid attention to the fact that when the electric power supplied to the discharge tube 45 is greatly lower than the rated level but the duration of the low electric power state is within a predetermined period, the problems will not occur. The present inventors have further paid attention to a fact that when the supplied electric power level is raised to the rated level, appropriately adjusting the speed at which the electric power is changed prevents the problems from occurring.

To this end, the electric power control portion 102 controls the light source driver 19 to perform the following three action modes: the normal mode; a low luminance mode; and the power saving mode. The normal mode is an action mode in which the electric power supplied to the discharge tube 45 is set to the rated level (280 W, for example, or 100%). The low luminance mode is an action mode in which the electric power supplied to the discharge tube 45 is set to a level slightly lower than the rated level (200 W, for example, or about 70%). The power saving mode is an action mode in which the electric power supplied to the discharge tube 45 is set to a level greatly lower than the rated level (50% or lower, preferably about 20% to 30%) but a small degree of light emission of the discharge tube 45 can be maintained.

Further, to avoid the problems with the discharge tube 45, the electric power control portion 102 has a function of limiting the duration of the power saving mode and a function of limiting the speed at which the supplied power level is raised from the level in the power saving mode. That is, the electric power control portion 102 monitors the period from the time when the power saving mode starts and powers off the projector 1 when a preset OFF period elapses so that the power saving mode does not continue for a period equal to or longer than the preset period.

Further, when the action mode is changed from the power saving mode to the normal mode or the low luminance mode, the electric power control portion 102 restricts the speed at which the level of the electric power supplied to the discharge tube 45 is changed. The level changing speed is set to a speed lower than the speed at which the level of the electric power supplied to the discharge tube 45 is raised from that in the low luminance mode to that in the normal mode.

When the supplied electric power level is changed from that in the normal mode to that in the low luminance mode and from that in the low luminance mode to that in the normal mode, the electric power control portion 102 does not restrict the speed at which the supplied electric power level is changed. In this case, the electric power supplied from the light source driver 19 to the discharge tube 45 is changed at a speed achievable by a circuit in the light source driver 19. The speed is called a speed at which the supplied electric power level is normally changed (normal speed). On the other hand, when the supplied electric power level is lowered to that in the power saving mode and raised from that in the power saving mode, the electric power control portion 102 sets the speed at which the light source driver 19 changes the supplied electric power level at a speed slower than the normal speed.

Figure 2A:
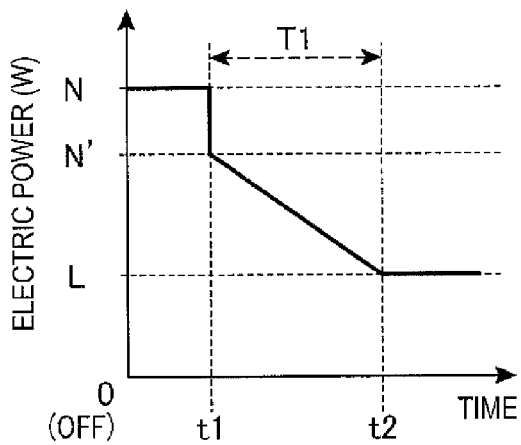
FIGS. 2A to 2C are graphs showing changes in electric power supplied to a discharge tube.
Figure 2B:
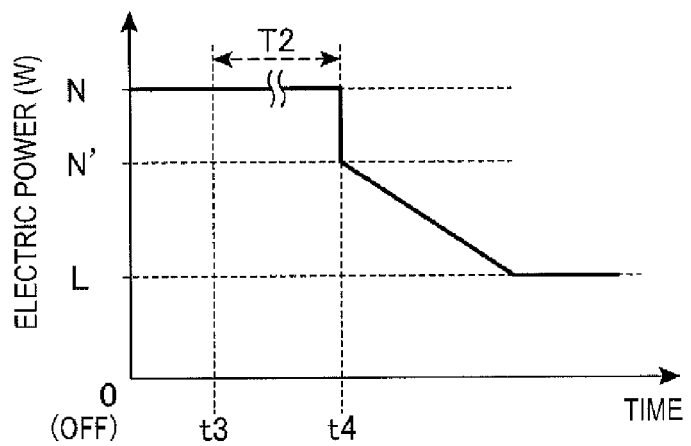
Figure 2C:
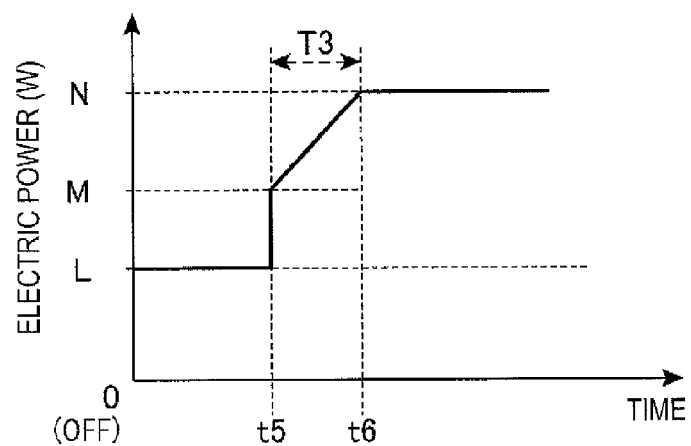

FIGS. 2A to 2C are graphs showing the change in the electric power supplied to the discharge tube 45. FIG. 2A shows an example in which the action mode is changed from the normal mode to the power saving mode when the mute action or the cover close action is performed. FIG. 2B is an example in which the supplied electric power is changed from that in the normal mode to that in the power saving mode when the sleep mode is performed. FIG. 2C shows an example in which the action mode is changed from the power saving mode to the normal mode. In FIGS. 2A to 2C, the vertical axis represents the electric power supplied to the discharge tube 45 (W), and the horizontal axis represents time. Further, the supplied electric power levels described above are indicated along the vertical axis as follows: N is the rated level (rated electric power level); N' is the level in the low luminance mode; and L is the level in the power saving mode (power saving level).

To change the action mode to the power saving mode during the normal mode, the electric power control portion 102 controls the light source driver 19 to change the level of the electric power supplied to the discharge tube 45 from the level N to the level N' (time t1), as shown in FIG. 2A. The level N is changed to the level N' at the normal speed, and the supplied electric power is therefore quickly changed as shown in FIG. 2A.

The electric power control portion 102 subsequently changes the level of the electric power supplied to the discharge tube 45 from the level N' to the level L in a period T1 from the time t1 to t2. The speed at which the supplied electric power level is changed in the period T1 is a preset speed slower than the normal speed (about 10 W/sec, for example). The control shown in FIG. 2A is performed by the electric power control portion 102, for example, when the projection control portion 101 performs the mute action or the cover close action. When the user presses a mute button on the remote control or a mute button on the operation panel of the projector, or when it is detected that the cover is closed, the action mode is changed to the power saving mode, for example, 20 seconds (t2) after any of the actions described above (t1).

When the projector enters the sleep mode, the electric power control portion 102 performs control that changes the electric power supplied to the discharge tube 45 to that in the power saving mode. In this case, the electric power control portion 102, for example, maintains the level of the electric power supplied to the discharge tube 45 for a predetermined period T2, as shown in FIG. 2B. When the action mode returns from the power saving mode to the normal action mode, it takes a certain period to raise the supplied electric power level as described above. Therefore, when the projector enters the sleep mode, changing the action mode to the power saving mode undesirably causes the user to wait when the projector returns from the sleep mode. To lower the chance of causing the user to wait, the electric power control portion 102 waits for a period (period T2; from t3 to t4; five minutes, for example) after the projection control portion 101 causes the projector to enter the sleep mode. When the projection control portion 101 remains in the sleep mode and the period T2 elapses, the electric power control portion 102 causes the projector to enter the power saving mode. In the control described above, the level of the electric power supplied to the discharge tube 45 is lowered when the period T2 elapses (time t4) in FIG. 2B. The speed at which the supplied electric power level is lowered from the level N to the level N' at the time t4 is the normal speed described above, and the level is therefore quickly lowered in FIG. 23.

After the time t4 in FIG. 2B, that is, in a process of lowering the supplied electric power from the level N' to the level L, the electric power control portion 102 performs control that restricts the speed at which the supplied electric power level is changed, as in the period T1 shown in. FIG. 2A.

When the action mode returns from the power saving mode to the normal mode, the electric power control portion 102 raises the supplied electric power level as shown, for example, in FIG. 2C.

The electric power control portion 102 raises the supplied electric power level from the electric power level L in the power saving mode to an intermediate level M (time t5). The intermediate level M is a predetermined electric power level between the level L and the rated level N. It has been experimentally shown that even when the electric power supplied to the discharge tube 45 is sharply changed between the level L and the level M, no damage is made to the discharge tube 45. The electric power control portion 102 sharply changes the supplied electric power level to the level M in order to shorten the period required to return the normal mode. The speed at which the supplied electric power level is changed from the level L to the level M is the normal speed described above. A specific value of the level M is determined based, for example, on the specifications of the discharge tube 45 and is, for example, 60% of the rated value. Instead, the level M may be a limit determined based, for example, on the specifications of the discharge tube 45 or may be the limit from which a predetermined safety margin is subtracted.

The electric power control portion 102 then raises the supplied electric power level from the level M to the level N while restricting the speed at which the level of the electric power supplied to the discharge tube 45 to a fixed value or lower in a period T3 in FIG. 2C. The level changing speed in the period T3 is a preset speed or slower that causes the user to wait until time t6. The speed at which the supplied electric power level is changed in the period T3 may be equal to the speed in the period T1 shown in FIG. 2A or may be a speed different therefrom. The action shown in FIG. 2C is performed by the electric power control portion 102 after the sleep mode, the mute action, the cover close action, the no signal input state, the input signal detection state, or any other action or state which causes the action mode to be changed to the power saving mode and when the action mode returns to the normal mode. For example, during the mute action and when the mute button is pressed again (t5) before the OFF set period elapses (step S32 in FIG. 4), the mute action is terminated and the action mode returns to the normal mode (level N) after about 10 to 15 seconds or to the low luminance mode (Level N') in some cases (in a case where the action mode is the low luminance mode and then changed to the power saving mode) (t6).

As shown in FIGS. 2A to 2C by way of example, when the projection control portion 101 performs the non-projection control, the electric power control portion 102 controls the electric power supplied to the discharge tube 45 to cause the projector 1 to enter the power saving mode for power saving in the projector 1.

The lengths of T1, T2 (sleep set period), and T3, the length of each of the OFF set periods, and the speed at which the supplied electric power levels change in each of the periods T1 and T3 are set in advance and stored as the setting data 11B. The electric power control portion 102 performs the control described above in accordance with the details set in the setting data 11B.

When the projection control portion 101 performs the non-projection control, the electric power control portion 102 may always perform the control shown in FIGS. 2A to 2C. In the present embodiment, however, the user can choose whether or not the action mode is changed to the power saving mode when the non-projection control is performed.

Figure 3:
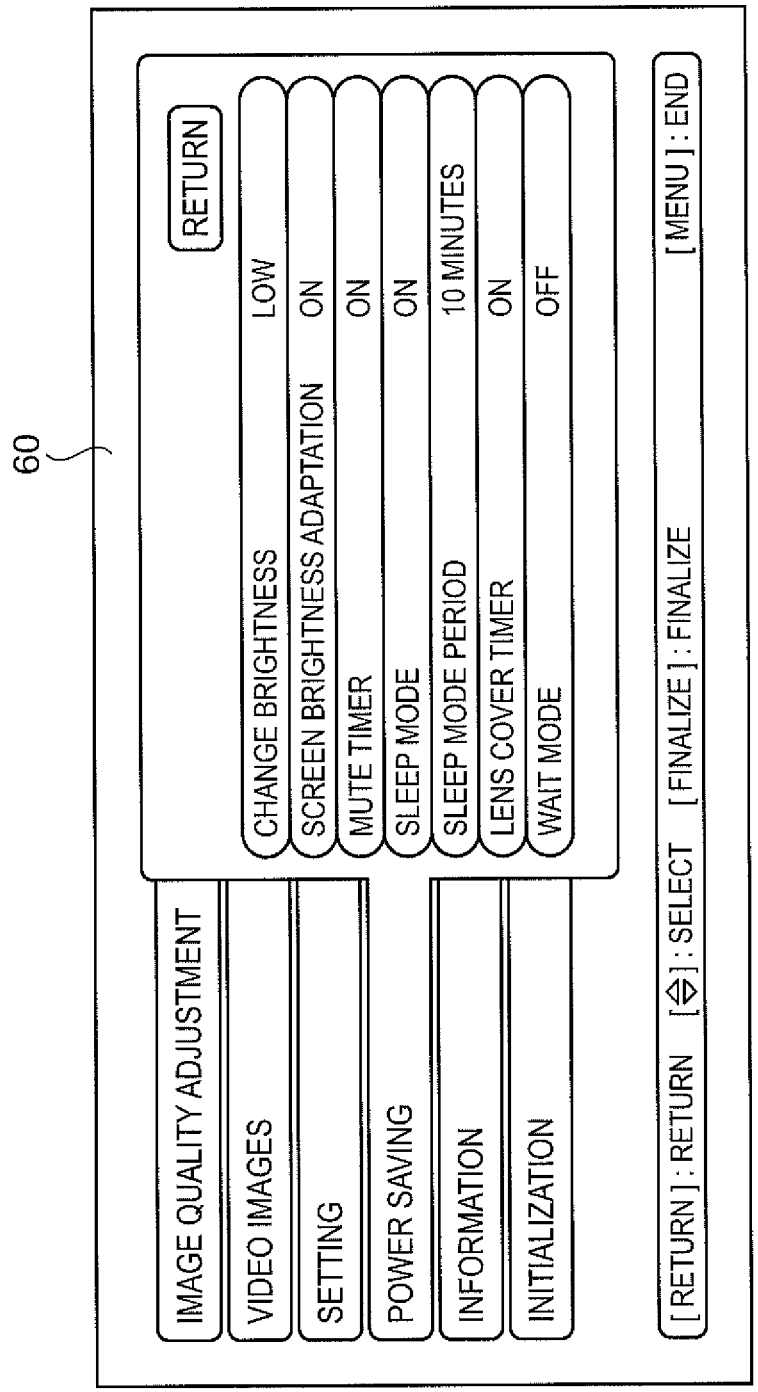
FIG. 3 shows an example of a setting screen that allows a user to choose whether or not the power saving mode is performed.

FIG. 3 shows an example of the setting screen 60, which allows the user to choose whether or not the action mode is changed to the power saving mode.

The setting screen 60 shown in FIG. 3 is displayed on the screen SC based on the function of the projection control portion 101 that controls the image processor 15 based on the OSD image data 11A.

When the user operates the remote control 5 or the operation panel 51 to issue an instruction of displaying the setting menu, the projection control portion 101 reads the OSD image data 11A and causes the projection unit 40 to display the setting screen 60. After the setting screen 60 is displayed, the user can operate the remote control 5 or the operation panel 51 to select each setting item in the setting screen 60 and determine details of the setting item. The setting processing portion 103 acquires the details determined by the setting operation and stores the details as the setting data 11B on a setting item basis. When details having been already set are changed, the setting processing portion 103 updates the setting data 11B in accordance with the changed details of the setting item.

In the setting screen 60 shown in FIG. 3 by way of example, the following items are arranged: "mute timer;" "sleep mode;" "sleep mode period;" and "lens cover timer." The user operates the remote control 5 or the operation panel 51 to select any of the setting items and chooses whether or not the power saving mode is performed.

The name of the setting item "mute timer" in the setting screen 60 means that it allows the user to activate a function of performing the mute action in such a way that the mute action continues for a predetermined period and then the projector 1 is powered off. "Mute timer" has two setting values, "timer on" and "timer off." When the setting value is "timer on," the electric power control portion 102 causes the projector 1 to enter the power saving mode when the mute action is performed, and the timer powers off the projector 1 after the mute action continues for the predetermined period. On the other hand, when the setting value is "timer off," the projector 1 is not powered off even when the mute action continues for a period longer than the predetermined period. Further, when the setting value is "timer off," the electric power control portion 102 does not cause the projector to enter the power saving mode. The predetermined period associated with "mute timer" is so set that the problems with the discharge tube 45 will not occur even when the level of the electric power supplied to the discharge tube 45 is changed to the power saving level and is, for example, 30 minutes. When the power saving mode is performed during the mute action, the projector 1 needs to be powered off after the mute action continues for 30 minutes in order to prevent the problems with the discharge tube 45 from occurring. Only when the user chooses the action on the projector 1 described above, that is, the action of powering off the projector 1 after 30 minutes elapses, the electric power control portion 102 can perform the power saving mode.

The names of the setting items "sleep mode" and "sleep mode period" in the setting screen 60 mean that it allows the user to activate a function of powering off the projector 1 after the sleep mode continues for a predetermined period. "Sleep mode" has two setting values, "timer on" and "timer off." When the setting value is "timer on," the projection control portion 101 can perform the sleep mode, and the electric power control portion 102 causes the projector to enter the power saving mode in the sleep mode.

Further, when the setting value of the "sleep mode" is "timer on," a function of powering off the projector 1 by using the timer after the sleep mode continues for a fixed period is also enabled.

The "sleep mode period" can be set only when the setting value of the "sleep mode" is "timer on." "Sleep mode period" has three setting values, "10 minutes," "20 minutes," and "30 minutes" or has specifications that do not allow the user to set "sleep mode period" in such a way that the sleep mode continues for a period longer than 30 minutes. The specifications limit the period during which the electric power control portion 102 performs the power saving mode to 30 minutes at longest.

In other words, the electric power control portion 102 can perform the power saving mode only when the sleep mode period is so set that the sleep mode continues for a period shorter than or equal to 30 minutes and then the projector 1 is powered off.

The name of the setting item "lens cover timer" in the setting screen 60 means that it allows the user to activate a function of powering off the projector 1 when it is determined that the lens cover 30 is located in the closed position C and after the cover close action continues for a predetermined period. The "lens cover timer" has two setting values, "timer on" and "timer off." When the setting value is "timer on," the electric power control portion 102 causes the projector 1 to enter the power saving mode when the cover close action is performed, and the timer powers off the projector 1 after the cover close action continues for the predetermined period. On the other hand, when the setting value is "timer off," the projector 1 is not powered off even when the cover close action continues for a period longer than the predetermined period. Further, when the setting value is "timer off," the electric power control portion 102 does not cause the projector to enter the power saving mode. The predetermined period associated with the "lens cover timer" is so set that the problems with the discharge tube 45 will not occur even when the level of the electric power supplied to the discharge tube 45 is changed to the power saving level, and is specifically 30 minutes described above. When the power saving mode is performed during the cover close action, the projector 1 needs to be powered off after the cover close action continues for 30 minutes in order to prevent the problems with the discharge tube 45 from occurring.

As described above, the setting items in the setting screen 60 that are associated with the non-projection action of the projection control portion 101 are configured to allow the user to choose whether or not to perform the action of the projector 1 required to prevent the problems with the discharge tube 45 from occurring when the power saving mode is performed. The electric power control portion 102 can perform the power saving mode only when the user chooses to allow the projector 1 to perform the action required to prevent the problems with the discharge tube 45 resulting from the power saving mode from occurring and sets the projector 1 to perform the action. In other words, the power saving mode can be performed only when the user allows the projector 1 to perform the action required in association with performing the power saving mode.

Therefore, in the power saving mode, even when the level of the electric power supplied to the discharge tube 45 is set at a level lower than the rated level, the problems with the discharge tube 45 resulting from long duration of the power saving mode will not occur. Further, from the viewpoint of the user, the action of the projector 1 required when the power saving mode is chosen is not performed unless the user intentionally sets the projector 1 to perform the action, and power saving can be effectively achieved without compromising the convenience of the user.

Figure 4:
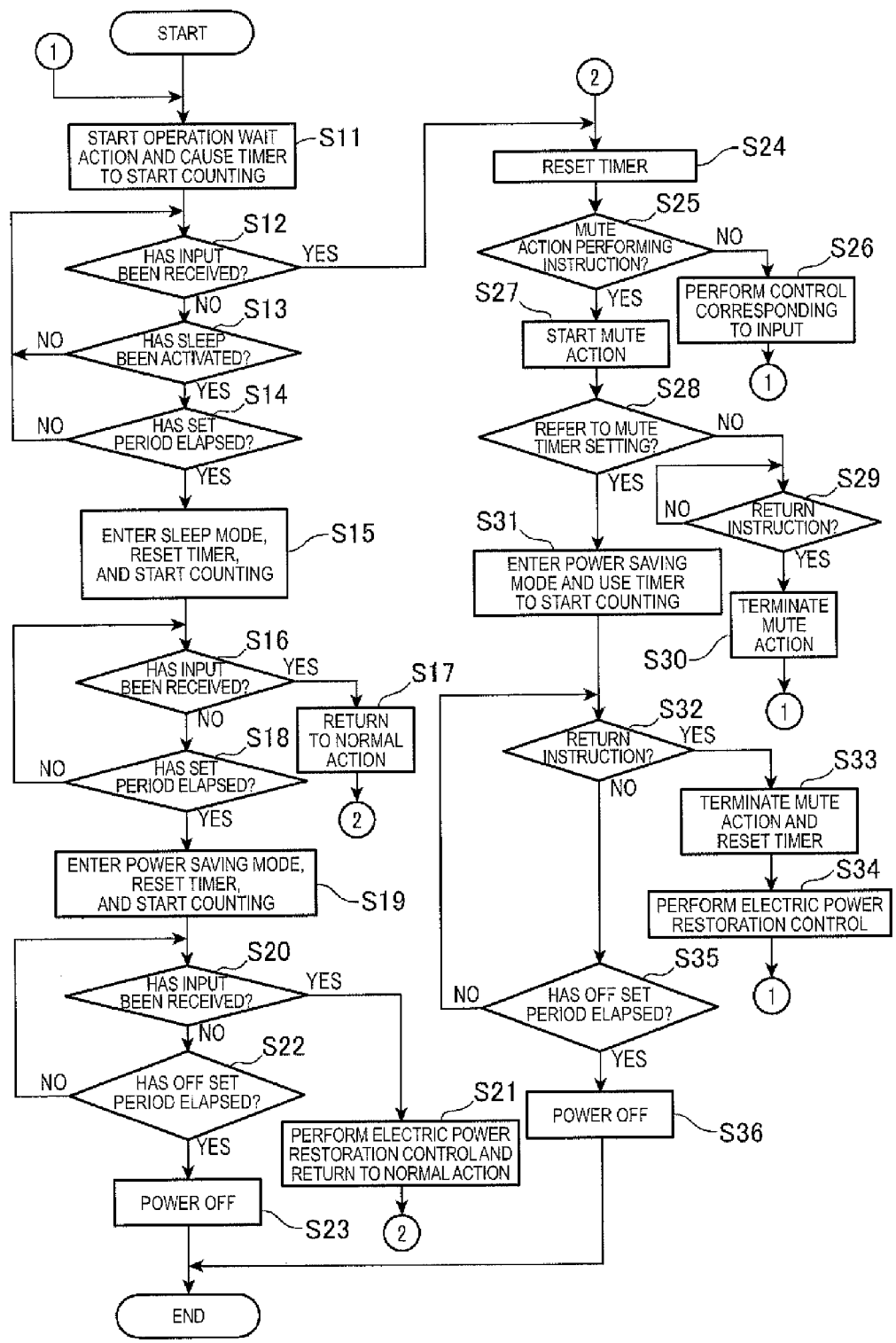
FIG. 4 is a flowchart showing the action of the projector.

FIG. 4 is a flowchart showing the action of the projector 1. FIG. 4 shows action involved in the sleep mode and a series of action involved in the mute action of the projector 1.

As described above, the projector 1 enters the sleep mode when a state in which the operation panel 51 or the remote control 5 is not operated or a state in which no input image data S1 is inputted continues in the normal action state. Further, when the user issues an instruction of performing the mute action during the normal action state or during the sleep mode, the projector 1 starts the mute action in response to the instruction.

After the projector 1 is powered on, the controller 10 performs the normal action and waits for operation of the operation panel 51 or the remote control 5, an input of input image data S1, or any other input (step S11). When the projection control portion 101 starts waiting in step S11, the function of the timer 104 is used to start counting the wait period. The count action then continues as long as no input is received.

The projection control portion 101 determines whether or not an input has been received whenever a predetermined period elapses (step S12). When no input has been received (step S12; No), the projection control portion 101 refers to the setting data 11B and determines whether or not the sleep mode has been activated (step S13). When the sleep mode can be activated, the sleep action described above is performed, whereas when the sleep mode is deactivated, the sleep action described above cannot be performed. When the sleep mode is deactivated (step S13; No), the projector does not enter the sleep mode (returns to step S12).

When the sleep mode is activated (step S13; Yes), the projection control portion 101 refers to the count of the wait period, the counting of which has started in step S11. The projection control portion 101 then determines whether or not the wait period has become equal to a set period based on which the sleep action starts (step S14). The set period is a latency after which the sleep action starts in a no input state and is, for example, 20 seconds and stored as the setting data 11B. When the wait period has not become equal to the set period (step S14; No), the projection control portion 101 returns to step S12 and keeps waiting. When it is determined that the wait period has become equal to the set period (step S14; Yes), the projection control portion 101 causes the projector to enter the sleep mode (step S15). In step S15, where the projection control portion 101 causes the projector to enter the sleep mode, the projection control portion 101 controls the light modulator 42, for example, to display a plain black image. Further, in step S15, the projection control portion 101 resets the count of the wait period having been counted by the timer 104 and starts counting the sleep period.

After the projector 1 enters the sleep mode, the projection control portion 101 waits for an input (such as pressing operation performed on remote control, pressing operation performed on operation panel, and incoming input signal) (step S16). The projection control portion 101 determines in step S16 whether or not an input has been received whenever a predetermined period elapses. When an input has been received (step S16; Yes), the projection control portion 101 returns to the normal projection state (step S17). The projection control portion 101 proceeds to step S24, which will be described later, to perform an action corresponding to the input.

When no input has been received (step S16; No), the projection control portion 101 refers to the count of the sleep period, the counting of which has started in step S15. The projection control portion 101 then determines whether or not the sleep period has become equal to a preset period (first predetermined period) (step S18). The "first predetermined period" in the determination process in step S18 corresponds to the wait period T2 shown in FIG. 2B.

When the sleep period has not become equal to the first predetermined period (step S18; No), the projection control portion 101 returns to step S16.

On the other hand, when the sleep period has become equal to the first predetermined period (step S18; Yes), the electric power control portion 102 controls the light source driver 19 to change the electric power supplied to the discharge tube 45 from that in the normal mode to that in the power saving mode (step S19). In step S19, the electric power control portion 102 changes the electric power supplied from the light source driver 19, as shown in FIG. 2B. Further, in step S19, the projection control portion 101 resets the count provided by the timer 104 and starts counting the duration of the power saving mode.

After the projector enters the power saving mode, the projection control portion 101 determines whether or not an input has been received whenever a predetermined period elapses (step S20). When an input has been received (step S20; Yes), the projection control portion 101 returns to the normal projection state (step S21). After returning to the normal projection state, the projection control portion 101 proceeds to step S24, which will be described later, to perform an action corresponding to the input.

In step S21, the electric power control portion 102 changes the electric power supplied to the discharge tube 45 from that in the power saving mode back to that in the normal mode. The electric power control portion 102 first raises the supplied electric power level from the supplied electric power level in the power saving mode (level L) to the intermediate level (level M), as shown in FIG. 2C. The electric power control portion 102 subsequently raises the supplied electric power level from the intermediate level to the rated electric power level N at a restricted speed.

When no input has been received (step S20; No), the projection control portion 101 refers to the count of the duration of the power saving mode, the counting of which has started in step S19. The projection control portion 101 then determines whether or not the count of the duration of the power saving mode has reached a preset period (second predetermined period) (step S22). The "second predetermined period" in the determination process in step S22 is the setting value of "sleep mode period" set in the setting screen 60 (FIG. 3).

When the duration of the power saving mode has not become equal to the second predetermined period (step S22; No), the projection control portion 101 returns to step S20. When the duration of the power saving mode has become equal to the second predetermined period (step S22; Yes), the projector 1 is powered off (step S23) and the action thereof is terminated.

On the other hand, when an input has been received (step S12; Yes, step S16; Yes+step S17, step 20; Yes+step S21), the projection control portion 101 proceeds to step S24. In step S24, the projection control portion 101 rests the count provided by the timer 104 that is performing counting. The projection control portion 101 subsequently determines whether or not the input corresponds to a mute action performing instruction issued by the user who operates the operation panel 51 or the remote control 5 (step S25). When the input does not correspond to the mute action performing instruction (step S25; No), the projection control portion 101 performs an action corresponding to the input (step S26) and returns to step S11.

When the input corresponds to the mute action performing instruction (step S25; Yes), the projection control portion 101 starts the mute action and, for example, controls the light modulator 42 to display a plain black or blue image or a logo image (step S27). The projection control portion 101 then refers to the setting data 11B and determines whether the setting value in the mute timer setting is "timer on" or "timer off" (step S28). The setting value in the mute timer setting is the third predetermined period set based on the "mute timer" item in the setting screen 60 (FIG. 3). When the setting value of the mute timer is "timer off" (step S28; No), which means that the mute timer has not been set, the projection control portion 101 does not change the electric power supplied to the discharge tube 45 but waits for operation of instructing return from the mute action (step S29). When the instruction of return from the mute action has been received (step S29; Yes), the projection control portion 101 terminates the mute action and instructs the light modulator 42 to stop displaying the plain black image or any other image, changes the projection state back to the normal projection state (step S30), and returns to step S11.

When the setting value of the mute timer is "timer on" (step S28; Yes), the projection control portion 101 starts counting the duration of the mute action by using the timer 104, and the electric power control portion 102 causes the projector to enter the power saving mode (step S31). In step S31, the electric power control portion 102 changes the electric power supplied from the light source driver 19 as shown in FIG. 2A.

After the projector 1 enters the power saving mode, the projection control portion 101 determines whenever a predetermined period elapses whether or not operation of instructing return from the mute action (pressing mute button on remote control or operation panel) has been performed (step S32). When the return instruction has been received (step S32; Yes), the projection control portion 101 terminates the mute action to return to the normal projection state and resets the count provided by the timer 104 (step S33). At this point, the electric power control portion 102 causes the projector to enter the normal mode from the power saving mode (step S34). The electric power control portion 102 raises the supplied electric power level from that in the power saving mode to the intermediate level M and then raises the supplied electric power level to the rated level N at a predetermined speed or slower.

When no instruction of return from the mute action has been received (step S32; No), the projection control portion 101 refers to the count of the duration of the mute action, the counting of which has started in step S31. The projection control portion 101 then determines whether or not the count of the duration of the power saving mode has reached a preset period (fourth predetermined period) (step S35). The "fourth predetermined period" in the determination process in step S35 is the predetermined period associated with "mute timer" preset as described above.

When the duration of the power saving mode has not become equal to the fourth predetermined period (step S35; No), the projection control portion 101 returns to step S32. When the duration of the power saving mode has become equal to the fourth predetermined period (step S35; Yes), the projector 1 is powered off (step S36), and the action thereof is terminated.

Figure 5:
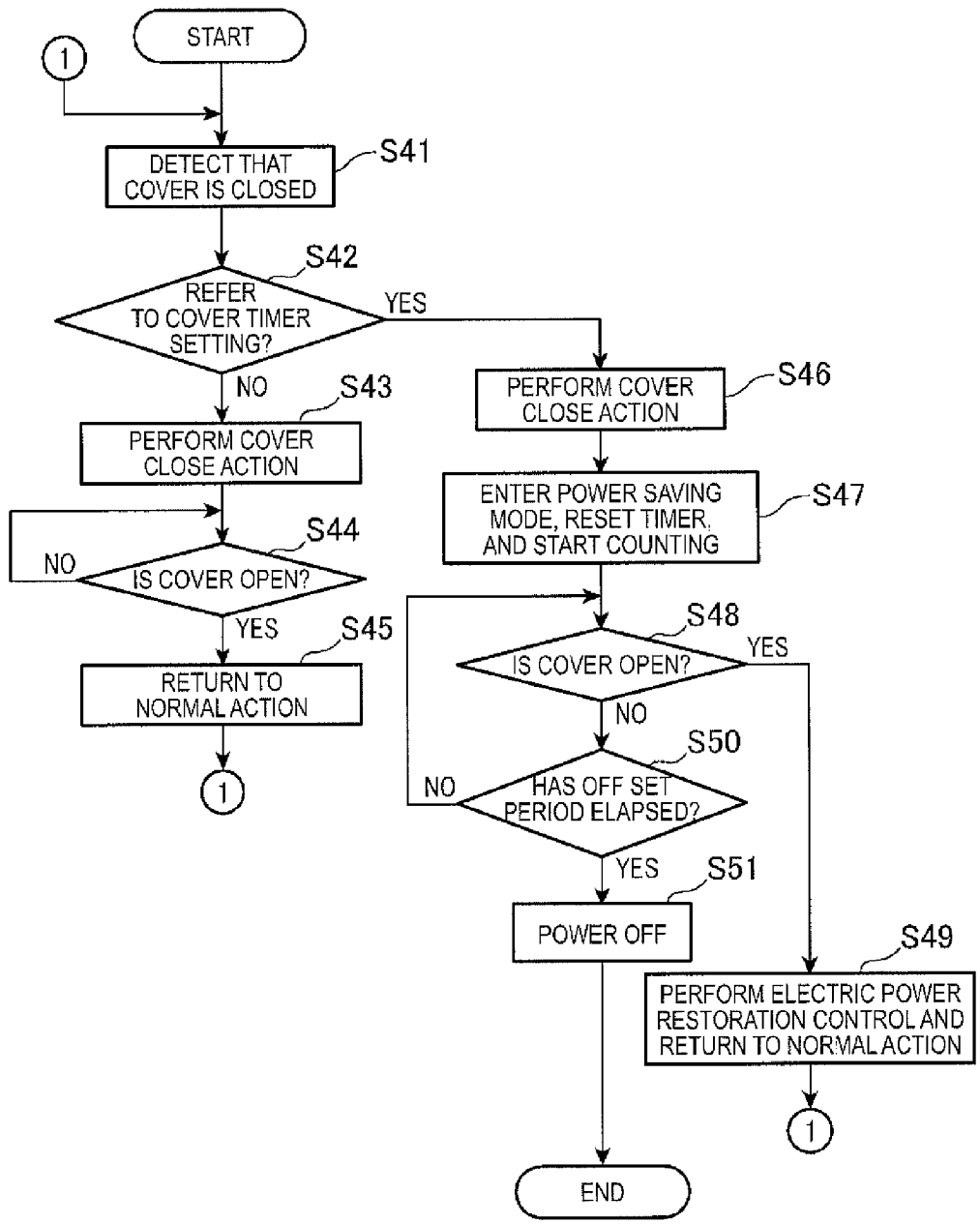
FIG. 5 is another flowchart showing the action of the projector.

FIG. 5 is another flowchart showing the action of the projector 1. FIG. 5 shows a series of action involved in the cover close action of the projector 1.

The actions in FIG. 5 start when the projector 1 operates in the normal action state and the projection control portion 101 detects that the lens cover 30 is not located in the open position O based on the detection value from the cover detector 31 (step S41). The normal operation state includes a state in which the projection control portion 101 waits for an input after the projector 1 is powered on and a state in which the projection control portion 101 displays an image on the screen SC based on input image data S1.

Having detected in step S41 that the lens cover 30 is not located in the open position O, the projection control portion 101 determines whether the setting value of the lens cover timer is "timer on" or "timer off" (step S42). The setting value of the lens cover timer is set based on the setting screen 60 (FIG. 3) and stored as the setting data 11B.

When the setting value of the lens cover timer is "timer off," which means that the lens timer is not working, the projection control portion 101 performs, for example, an action of instructing the light modulator 42 to display a plain black image (cover close action) (step S43) and then waits without changing the electric power supplied to the discharge tube 45 until the lens cover 30 is located in the open position O (step S44). When the projection control portion 101 detects that the lens cover 30 is open based on the detection value from the cover detector 31 (step S44; Yes), the projection control portion 101 changes the display state back to the normal projection state in which input image data are displayed (step S45) and returns to step S41.

On the other hand, when the setting value of the lens cover timer is "timer on" (step S42; Yes), the projection control portion 101 performs the cover close action (step S46) and causes the projector to enter the power saving mode to lower the electric power supplied to the discharge tube 45 to the power saving level (step S47). In step S47, the projection control portion 101 resets the count provided by the timer 104 and starts counting the duration of the power saving mode.

The projection control portion 101 then determines whether or not the lens cover 30 is located in the open position O (step S48). Having detected that the lens cover 30 is located in the open position O (step S48; Yes), the projection control portion 101 changes the projection state back to the normal projection state (step S49) and returns to step S41. In step S49, the electric power control portion 102 causes the projector to enter the normal mode from the power saving mode. The electric power control portion 102 raises the supplied electric power level from the supplied electric power level in the power saving mode to the intermediate level M and then raises the supplied electric power level to the rated level at a predetermined speed or slower, as shown in FIG. 2C.

When the lens cover 30 is not located in the open position O (step S48; No), the projection control portion 101 refers to the count of the duration of the power saving mode, the counting of which has started in step S47. The projection control portion 101 then determines whether or not the count of the duration of the power saving mode has reached a preset period (fifth predetermined period) (step S50). The "fifth predetermined period" in the determination process in step S49 is the predetermined period associated with the "lens cover timer" preset as described above.

When the duration of the power saving mode has not become equal to the fifth predetermined period (step S50; No), the projection control portion 101 returns to step S48. When the duration of the power saving mode has become equal to the fifth predetermined period (step S50; Yes), the projector 1 is powered off (step S51) and the action thereof is terminated.

As described above, the projector 1 according to the embodiment to which the invention is applied is the projector 1 including the discharge tube 45 as the light source and further including the light source driver 19 and the electric power control portion 102. The projector 1 uses the light source driver 19 to supply the discharge tube 45 with electric power. Further, the projector 1 uses the electric power control portion 102 to control the level of the electric power supplied from the light source driver 19 to the discharge tube 45 to perform the normal mode, in which the light source driver 19 supplies electric power of the rated electric power level, and the power saving mode, in which the light source driver 19 supplies electric power of the power saving level lower than the rated electric power level. When the action mode is changed from the power saving mode to the normal mode, the electric power control portion 102 changes the level of the electric power supplied from the light source driver 19 to the discharge tube 45 in a restricted manner. The configuration described above, which changes the electric power supplied to the discharge tube 45 to the power saving level, allows power saving. Further, when the electric power supplied to the discharge tube 45 is changed from the power saving level to the rated electric power level in the normal state, the electric power level is changed in a restricted manner to prevent a sharp change in the electric power level. As a result, even when the supplied electric power is reduced to an electric power level where it is feared that the life of the discharge tube 45 is undesirably affected, no damage is made to the discharge tube 45 when the electric power level is changed back to that in the normal state. The electric power supplied to the discharge tube 45 can thus be greatly reduced as compared with a case in related art, and power saving in the projector 1 can be effectively achieved.

Further, the electric power control portion 102 changes the electric power level in a restricted manner at least from the intermediate level (level M), which is higher than the power saving level (level L), to the rated electric power level (level N). In this case, the electric power level can be changed between the levels L and M in a non-restricted manner. The electric power level can therefore be controlled in the following two ways: The electric power level is so changed in a restricted manner that the life of the discharge tube 45 is not affected; and the electric power level is quickly changed to the extent that the life of the discharge tube 45 is not affected. As a result, not only can effective power saving be achieved but also no damage is made to the discharge tube 45 and the period required to change the action mode from the power saving mode to the normal mode can be shortened.

Further, in the process of changing the level of the electric power supplied from the light source driver 19, the electric power control portion 102 raises the electric power level from the level M to the level N at a slower speed than the speed in the process of changing the electric power level from the level L to the level M. As a result, no damage is made to the discharge tube 45 even when the electric power supplied to the discharge tube 45 is changed in the power saving mode to the level L, which is greatly lower than the rated electric power, whereby effective power saving can be achieved.

The projector 1 further includes the projection unit 40 including the discharge tube 45, the light modulator 42, and the projection system 43. Further, the projection control portion 101 controls the projection unit 40 to perform the projection control, in which light is projected, and the non-projection control, in which the projection section performs no projection. The electric power control portion 102 causes the projector to enter the power saving mode when the projection control portion 101 performs the non-projection control including a process of turning off the discharge tube 45.

The non-projection control includes the sleep mode, the mute action, and the cover close action. In this case, when the mute action, the sleep action, the cover close action, or an action including a process of turning off the discharge tube 45 is performed, the electric power supplied to the discharge tube 45 can be reduced, whereby power saving is effectively achieved. Further, when the mute action, the sleep action, or the cover close action is changed back to the normal action state, the electric power level is changed in a restricted manner, whereby the life of the discharge tube 45 is not affected even when the power saving level is set at a small value.

Further, the electric power control portion 102 does not cause the projector to enter the power saving mode until a preset period elapses after the projection control portion 101 causes the projector to enter the sleep mode. As a result, the operation is performed in a short period after the sleep action starts, whereby the latency required to return from the sleep action to the normal action state can be shortened.

Further, the electric power control portion 102 changes or lowers the level of the electric power supplied to the discharge tube 45 in a restricted manner when the action mode is changed from the normal mode to the power saving mode as shown in the period T1 in FIG. 2A and the period T2 in FIG. 2B. As a result, even when the power saving level is set at an electric power level so low that it is feared that the life of the discharge tube 45 is undesirably affected, no damage is made to the discharge tube 45 in the process of lowering the electric power level.

Moreover, the electric power control portion 102 can set the electric power supplied to the discharge tube 45 at a low luminance level (level N' shown in FIG. 2A) lower than the rated electric power level but higher than the power saving level. When the action mode is changed from the normal mode to the power saving mode, the electric power level is changed in a non-restricted manner until the level N' is reached, but the electric power level is changed in a restricted manner in the process of lowering the electric power level from the level N' to the level L. In this case, the electric power level can be controlled in the following two ways: The electric power level is quickly lowered to the extent that the life of the discharge tube 45 is not affected; and the electric power level is lowered at a speed so low that the life of the discharge tube 45 is not affected.

Further, the electric power control portion 102 causes the projector to enter the power saving mode based on the setting data 11B representing setting values set based on the setting screen 60. In this case, the user can choose whether or not the electric power supplied to the discharge tube 45 is lowered when the sleep mode, the mute action, or the cover close action is performed, whereby optimum action can be performed in consideration of the latency required when the action mode is changed from the power saving mode to the normal mode and the tendency of the user who uses the projector. Power saving in the projector 1 is therefore more effectively achieved without compromising the convenience of the user.

The embodiment described above is only an example of a specific aspect to which the invention is applied and does not limit the scope of the invention. The invention is also applicable to an aspect different from the embodiment described above. In the embodiment described above, the electric power control portion 102 in the controller 10 controls the light source driver 19 to change the electric power supplied to the discharge tube 45 by way of example. The invention is not necessarily configured this way. For example, a section that adjusts the electric power supplied to the discharge tube 45 may be provided between the light source driver 19 and the discharge tube 45. Further, the number of discharge tubes 45 provided in the projector 1 is not limited to one. In a configuration including a plurality of discharge tubes 45, a section that adjusts the electric power supplied to the plurality of discharge tubes 45 as a whole may be provided, or the electric power supplied to each of the discharge tubes 45 may be independently adjustable. Further, the invention is not necessarily applied to the case where the electric power control portion 102 causes the projector to enter the power saving mode when the projection control portion 101 performs the sleep mode, the mute action, or the cover close action. The electric power control portion 102 may cause the projector to enter the power saving mode in synchronization with any other action of the projection control portion 101 or independently of the action of the projection control portion 101.

Further, for example, the above embodiment has been described with reference to the case where three transmissive or reflective liquid crystal light valves corresponding to RGB colors are used as light modulators. The invention is not necessarily configured this way. For example, a combination of a single liquid crystal light valve and a color wheel may be employed. Further, a method using three digital mirror devices (DMDs) that modulate RGB color light fluxes, a method using a combination of a single digital mirror device and a color wheel, or other methods may be employed. When only one liquid crystal panel or a DMD is used as a display section, a member corresponding to a light combining system, such as a cross dichroic prism, is not necessary. Further, any configuration that can modulate light emitted from a light source can be employed with no problem instead of a liquid crystal panel or a DMD device, and other detailed configurations of the projector can be arbitrarily changed.

Further, the invention is applicable not only to a front projection projector that performs projection on a screen from the side where a projected image is observed but also to a rear projection projector that performs projection from the side opposite to the side where a projected image is observed. In addition, an apparatus to which the invention is applied is not limited to the embodiment described above.

What is claimed is:

1. A projector that includes a discharge tube and projects an image by using a light source including the discharge tube, the projector comprising:
a discharge tube drive section that supplies the discharge tube with electric power; and
an electric power control section that controls the level of the electric power with which the discharge tube drive section supplies the discharge tube to perform a normal mode in which the discharge tube drive section supplies electric power of a rated electric power level, a power saving mode in which the discharge tube drive section supplies electric power of a first power saving level lower than the rated electric power level when the image is not required to be projected, and a low luminance mode in which the discharge tube drive section supplies electric power of a second power saving level lower than the rated electric power level but higher than the first power saving level, and when the level of the electric power supplied to the discharge tube is changed from a normal mode to a low luminance mode, a speed at which the level of the electric power supplied to the discharge tube is changed is not restricted, but when the level of the electric power supplied to the discharge tube is changed to that in the power saving mode or raised from that in the power saving mode, the speed at which the level of the electric power supplied to the discharge tube is changed is set to a speed slower than a normal speed, and when the level of the electric power supplied to the discharge tube is changed from the first power saving level to an intermediate level which is lower than the rated electric power level and the second power saving level but higher than the first power saving level, a speed at which the level of the electric power supplied to the discharge tube is changed is not restricted.

2. The projector according to claim 1, wherein the electric power control section changes the level of the electric power supplied to the discharge tube in a restricted manner when the power saving mode is changed back to the normal mode or when the normal mode is changed to the power saving mode.

3. The projector according to claim 1, further comprising:
a projection section including the discharge tube, a modulation section that modulates light emitted from the discharge tube, and a projection system that projects the light modulated by the modulation section; and
a projection control section that performs non-projection control in which projection performed by the projection section is terminated by carrying out a process of turning off the discharge tube,
wherein the electric power control section causes the projector to enter the power saving mode when the projection control section performs the non-projection control.

4. The projector according to claim 3, wherein as the process of turning off the discharge tube, any of the following actions is detected: a mute action in which the image display action is terminated in accordance with predetermined operation; a sleep action in which the projector waits until the projector is operated; a cover close action in which a cover blocks the projection system; an elapse of a predetermined period during which no signal is inputted; and an elapse of a predetermined period during which a signal input is searched, and
the discharge tube is turned off when a predetermined period elapses after the power saving mode starts.

5. The projector according to claim 4, wherein the electric power control section does not cause the projector to enter the power saving mode until a first predetermined period elapses after the projection control section starts the sleep action.

6. The projector according to claim 4, further comprising a setting section that sets whether or not the power saving mode is started,
wherein the electric power control section causes the projector to enter the power saving mode when the projection control section detects any of the mute action, the sleep action, the cover close action, the elapse of a predetermined period during which no signal is inputted, and the elapse of a predetermined period during which a signal input is searched and the setting section sets the power saving mode to be performed in response to the action.

7. A method for controlling a projector that includes a discharge tube and projects an image by using a light source including the discharge tube, the method comprising
controlling the level of electric power supplied to the discharge tube to perform a normal mode in which electric power of a rated electric power level is supplied to the discharge tube, a power saving mode in which electric power of a first power saving level lower than the rated electric power level is supplied to the discharge tube when the image is not required to be projected, and a low luminance mode in which electric power of a second power saving level lower than the rated electric power level but higher than the first power saving level is supplied, and when the level of electric power supplied to the discharge tube is changed from a normal mode to a low luminance mode, a speed at which the level of electric power supplied to the discharge tube is changed is not restricted, but when the level of electric power supplied to the discharge tube is changed to that in the power saving mode or raised from that in the power saving mode, the speed at which the level of electric power supplied to the discharge tube is changed is set to a speed slower than a normal speed, and when the level of the electric power supplied to the discharge tube is changed from the first power saving level to an intermediate level which is lower than the rated electric power level and the second power saving level but higher than the first power saving level, a speed at which the level of electric power supplied to the discharge tube is changed is not restricted.

8. The projector according to claim 1,
wherein the electric power control section supplies electric power lower than or equal to 50% of the rated electric power level in the power saving mode.

9. The projector according to claim 1,
wherein the electric power control section supplies electric power ranging from 20% of the rated electric power level to 30% thereof in the power saving mode.

* * * * *